(12) United States Patent
Fink et al.

(10) Patent No.: US 10,577,933 B2
(45) Date of Patent: Mar. 3, 2020

(54) COATING POCKET STRESS REDUCTION FOR ROTOR DISK OF A GAS TURBINE ENGINE

(71) Applicant: UNITED TECHNOLOGIES CORPORATION, Hartford, CT (US)

(72) Inventors: Evan K Fink, Cromwell, CT (US); Michael R DeRosa, Meriden, CT (US)

(73) Assignee: United Technologies Corporation, Farmington, CT (US)

( * ) Notice: Subject to any disclaimer, the term of this patent is extended or adjusted under 35 U.S.C. 154(b) by 916 days.

(21) Appl. No.: 14/911,759

(22) PCT Filed: Aug. 14, 2014

(86) PCT No.: PCT/US2014/051093
§ 371 (c)(1),
(2) Date: Feb. 12, 2016

(87) PCT Pub. No.: WO2015/023860
PCT Pub. Date: Feb. 19, 2015

(65) Prior Publication Data
US 2016/0201466 A1 Jul. 14, 2016

Related U.S. Application Data

(60) Provisional application No. 61/866,323, filed on Aug. 15, 2013.

(51) Int. Cl.
*F01D 5/02* (2006.01)
*F01D 11/00* (2006.01)
*F01D 11/12* (2006.01)

(52) U.S. Cl.
CPC ............ *F01D 5/021* (2013.01); *F01D 11/001* (2013.01); *F01D 11/122* (2013.01); *F05D 2220/32* (2013.01); *F05D 2230/50* (2013.01); *F05D 2240/24* (2013.01); *F05D 2250/71* (2013.01); *F05D 2260/94* (2013.01); *Y02T 50/671* (2013.01)

(58) Field of Classification Search
CPC ....................................................... F01D 5/066
See application file for complete search history.

(56) References Cited

U.S. PATENT DOCUMENTS

| | | | | |
|---|---|---|---|---|
| 3,617,150 A | * | 11/1971 | Wagle | F01D 5/066 415/173.7 |
| 5,232,339 A | * | 8/1993 | Plemmons | F01D 5/084 415/177 |
| 5,435,694 A | | 7/1995 | Kray et al. | |
| 8,403,645 B2 | * | 3/2013 | Barnes | F01D 5/143 416/234 |

(Continued)

OTHER PUBLICATIONS

European Extended Search Report dated Feb. 13, 2017, issued in the corresponding European Patent Applicatio No. 14835971.4.

*Primary Examiner* — Justin D Seabe
*Assistant Examiner* — Jason A Fountain
(74) *Attorney, Agent, or Firm* — Bachman & LaPointe, P.C.

(57) ABSTRACT

A rotor is provided for a gas turbine engine. The rotor includes a rim that extends transverse to the web. The rim has a rotor spacer arm which defines a coating pocket and a stress relief protrusion opposite the coating pocket.

12 Claims, 5 Drawing Sheets

(56) References Cited

U.S. PATENT DOCUMENTS

| | | | |
|---|---|---|---|
| 8,834,129 B2* | 9/2014 | Barnes | F01D 5/143 |
| | | | 416/193 A |
| 2006/0099078 A1 | 5/2006 | Rice et al. | |
| 2008/0181779 A1 | 7/2008 | Decardenas | |
| 2011/0064580 A1* | 3/2011 | Barnes | F01D 5/143 |
| | | | 416/204 A |
| 2012/0027606 A1 | 2/2012 | Malmborg | |
| 2016/0138408 A1* | 5/2016 | Bordne | F01D 5/066 |
| | | | 416/182 |

* cited by examiner

COATING POCKET STRESS REDUCTION FOR ROTOR DISK OF A GAS TURBINE ENGINE

CROSS-REFERENCE TO RELATED APPLICATION

This application claims priority to U.S. patent application Ser. No. 61/866,323 filed Aug. 15, 2013, which is hereby incorporated herein by reference in its entirety.

BACKGROUND

The present disclosure relates to a gas turbine engine and, more particularly, to a rotor disk of increased stress/strain capabilities with coating pockets.

Gas turbine engines, such as those that power modern commercial and military aircraft, generally include a compressor section to pressurize an airflow, a combustor section to burn a hydrocarbon fuel in the presence of the pressurized air, and a turbine section to extract energy from the resultant combustion gases.

The compressor section includes a case circumscribing an engine axis and axially alternating arrays of stationary vanes and rotatable blades. Each vane array may be constructed of multiple vane clusters distributed circumferentially about the interior of the case with each cluster being supported by the case. Some vane arrays include clusters of cantilevered vanes.

During engine operation, the cantilevered vanes are disposed in close proximity to a rub strip material recessed within a coating pocket of a rotor spacer arm. Under some operational conditions, the coating pocket may observe increased stress within the rotor spacer arm and thereby result in undesirable coating spallation.

SUMMARY

A rotor for a gas turbine engine, according to one disclosed non-limiting embodiment of the present disclosure, includes a rim that extends transverse to the web. The rim has a rotor spacer arm which defines a coating pocket and a stress relief protrusion opposite the coating pocket.

In a further embodiment of any of the foregoing embodiments of the present disclosure, the stress relief protrusion defines a point mismatch.

In a further embodiment of any of the foregoing embodiments of the present disclosure, the stress relief protrusion defines a first radius and a second radius. The first radius is blended into the web. In the alternative or additionally thereto, in the foregoing disclosed non-limiting embodiment, the first radius is at least about twice the radius of the second radius. In the alternative or additionally thereto, in the foregoing disclosed non-limiting embodiment, the first radius is about 450 mils (0.45 inches) and the second radius is about 160 mils (0.16 inches).

In a further embodiment of any of the foregoing embodiments of the present disclosure, the stress relief protrusion is axially aft of the web.

In a further embodiment of any of the foregoing embodiments of the present disclosure, the stress relief protrusion is axially between a first corner radius and a second corner radius of the coating pocket.

In a further embodiment of any of the foregoing embodiments of the present disclosure, the stress relief protrusion is axially aft of a high stress region axially between a first corner radius and a second corner radius of the coating pocket.

A rotor for a gas turbine engine, according to another disclosed non-limiting embodiment of the present disclosure, includes a rotor hub defined along an axis of rotation; a web that radially extends from the rotor hub; and a rim that axially extends from the web. The rim defines a first rotor spacer arm and a second rotor spacer arm. The first and second rotor spacer arm each includes a coating pocket. At least one rotor spacer arm includes a point mismatch on an inner surface opposite the coating pocket.

In a further embodiment of any of the foregoing embodiments of the present disclosure, the point mismatch is axially aft of the web.

In a further embodiment of any of the foregoing embodiments of the present disclosure, the point mismatch defines a first radius and a second radius. The first radius is blended into the web.

In a further embodiment of any of the foregoing embodiments of the present disclosure, the first radius is at least about twice the radius as the second radius.

In a further embodiment of any of the foregoing embodiments of the present disclosure, the point mismatch is axially between a first corner radius and a second corner radius of the coating pocket.

In a further embodiment of any of the foregoing embodiments of the present disclosure, the point mismatch is axially aft of a high stress region axially between the first corner radius and the second corner radius.

A method of stress reduction for a rotor of a gas turbine engine, according to another disclosed non-limiting embodiment of the present disclosure, includes forming a point mismatch to add weight to an inner surface of a rotor spacer arm that extends axially from a web opposite a coating pocket.

In a further embodiment of any of the foregoing embodiments of the present disclosure, the method includes forming the point mismatch with two concavities.

In a further embodiment of any of the foregoing embodiments of the present disclosure, the method includes forming the point mismatch with a first radius and a second radius. The first radius is blended into the web.

In a further embodiment of any of the foregoing embodiments of the present disclosure, the method includes forming the point mismatch axially aft of the web.

In a further embodiment of any of the foregoing embodiments of the present disclosure, the method includes fondling the point mismatch axially between a first corner radius and a second corner radius of the coating pocket.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description can be briefly described as follows.

DETAILED DESCRIPTION

Figure 1:
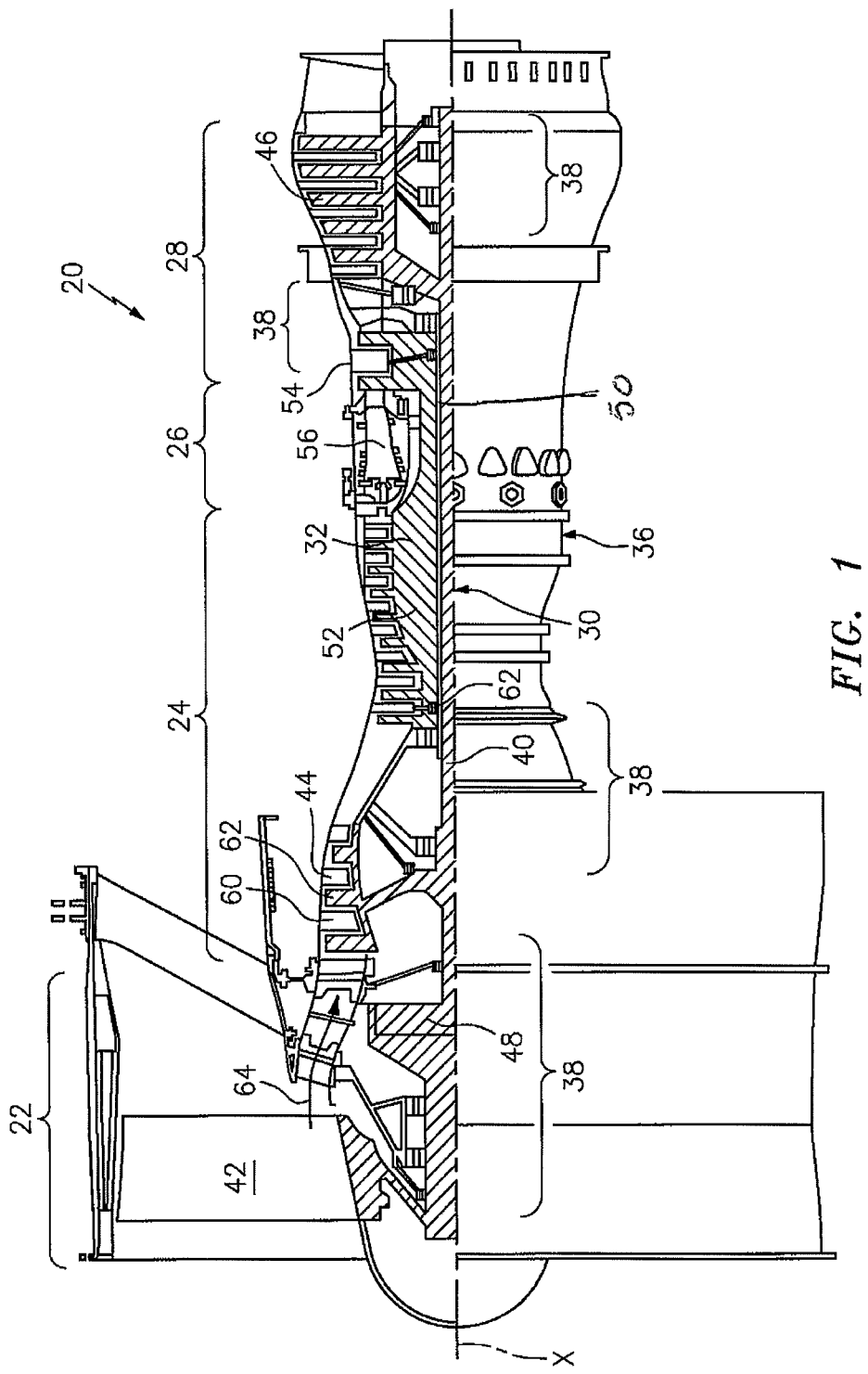
FIG. 1 is a schematic cross-section of an example gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. The fan section 22 drives air along a bypass flowpath while the compressor section 24 drives air along a core flowpath for compression and communication into the combustor section 26 then expansion through the turbine section 28. Although depicted as a turbofan in the disclosed non-limiting embodiment, it should be understood that the concepts described herein are not limited to use with turbofans as the teachings may be applied to other types of gas turbine engines.

The engine 20 generally includes a low spool 30 and a high spool 32 mounted for rotation about an engine central longitudinal axis X relative to an engine static structure 36 via several bearing structures 38. The low spool 30 generally includes an inner shaft 40 that interconnects a fan 42, a low pressure compressor 44 ("LPC") and a low pressure turbine 46 ("LPT"). The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a high pressure compressor 52 ("HPC") and high pressure turbine 54 ("HPT"). A combustor 56 is arranged between the high pressure compressor 52 and the high pressure turbine 54. The inner shaft 40 and the outer shaft 50 are concentric and rotate about the engine central longitudinal axis A which is collinear with their longitudinal axes.

Core airflow is compressed by the LPC 44 then the HPC 52, mixed with the fuel and burned in the combustor 56, then expanded over the HPT 54 and the LPT 46. The turbines 54, 46 rotationally drive the respective low spool 30 and high spool 32 in response to the expansion. The main engine shafts 40, 50 are supported at a plurality of points by the bearing structures 38 within the static structure 36. It should be understood that various bearing structures 38 at various locations may alternatively or additionally be provided.

Figure 2:
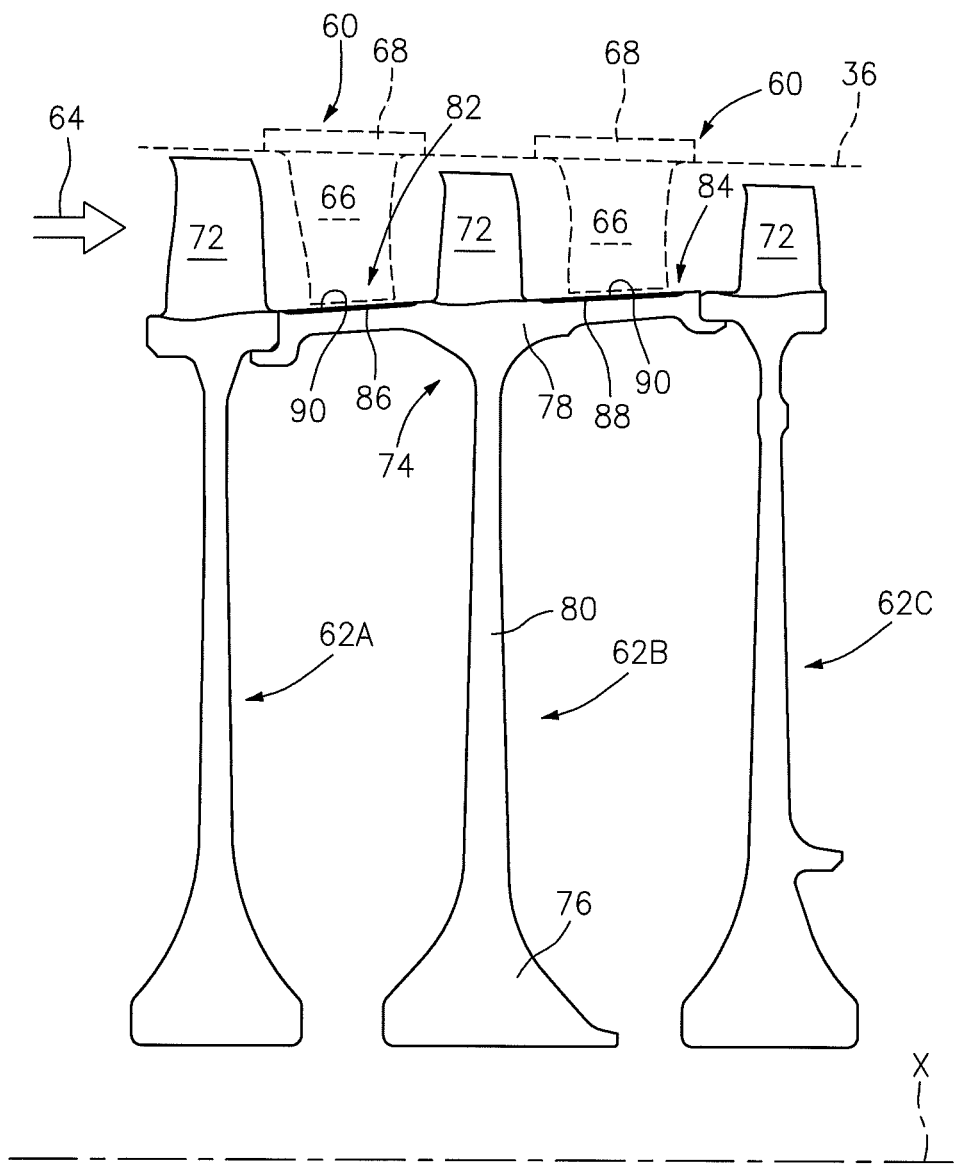
FIG. 2 is a schematic expanded cross-section of a portion of a high pressure compressor with a multiple of rotor disks.

With reference to FIG. 2, the HPC 52 includes a multiple of stages with alternate stationary vane arrays 60 and rotors 62 (only three shown) along an airflow passage 64. The rotors 62 may be assembled in a stacked configuration as a compressed tie-shaft configuration, in which a central shaft (not shown) is assembled concentrically within the rotor stack and axially secured, to generate a preload that compresses and retains the HPC rotors 62 together as a spool. Although the HPC 52 is illustrated in the disclosed non-limiting embodiment, other engine sections will also benefit herefrom. Moreover, although a particular number of stages are illustrated, it should be appreciated that any number of stages will benefit herefrom.

Each vane array 60 includes a multiple of cantilevered mounted stator vane airfoils 66 that extend in a cantilever manner from an outer platform 68 toward the engine central longitudinal axis X. The outer platform 68 is mounted to the engine static structure 36 such as an engine case via, for example, segmented hooks or other interfaces. It should be understood that various vane array configurations will benefit herefrom.

Figure 3:
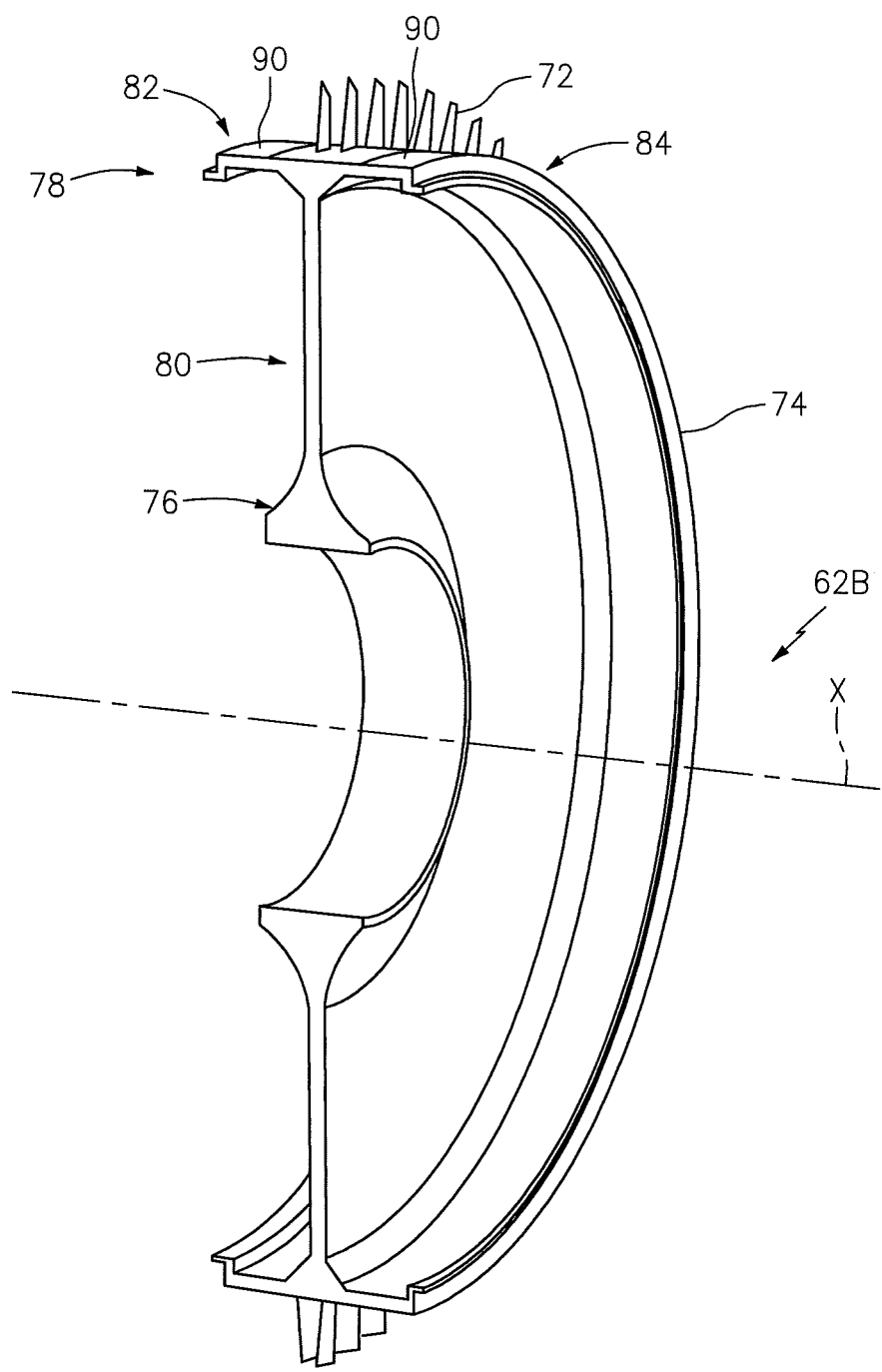
FIG. 3 is a perspective view of an integrally bladed rotor according to one disclosed non-limiting embodiment.

Each or particular rotors 62 may be an integrally bladed rotor 62B that includes a multiple of blades 72 integrally mounted to a respective rotor disk 74 (also shown in FIG. 3). The outer platform 68 of the vane arrays 60 and the rotor disk 74 of the spool at least partially bounds the airflow passage 64. The multiple of cantilevered mounted stator vane airfoils 66 extend in a cantilever manner toward the engine axis X to be disposed in close proximity to the rotor disk 74 across the airflow passage 64.

The rotor 62B generally includes a hub 76, a rim 78, and a web 80 that radially extends therebetween. The rim 78 of at least some rotors includes rotor spacer arms 82, 84 that respectively extend axially forward and axially aft with respect to the web 80 to space adjacent rotors 62A, 62C axially therefrom. It should be appreciated that rotor disks of various configurations with, for example, a single rotor spacer arm will also benefit herefrom.

Provision for close clearances between the cantilevered mounted stator vane airfoils 66 and the rotor disk 74 increases engine efficiency. As such, the rotor spacer arms 82, 84 each include coating pockets 86, 88 which receive a rub material 90 such as zinc oxide, aluminum oxide or other material upon which the multiple of cantilevered mounted stator vane airfoils 66 may rub.

Figure 4:
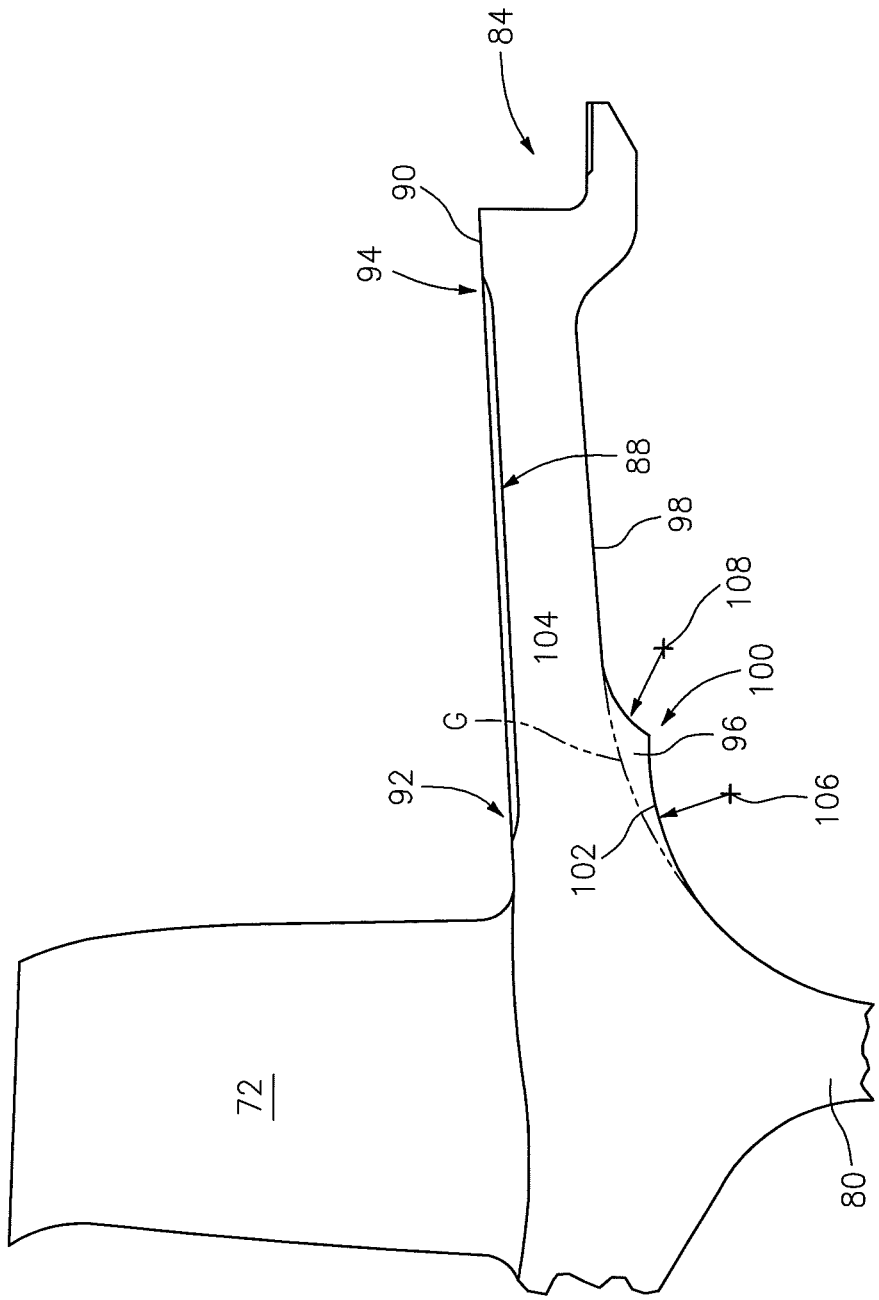
FIG. 4 is an expanded cross-section of a portion of the integrally bladed rotor of FIG. 3 provided with a stress relief protrusion.
Figure 5:
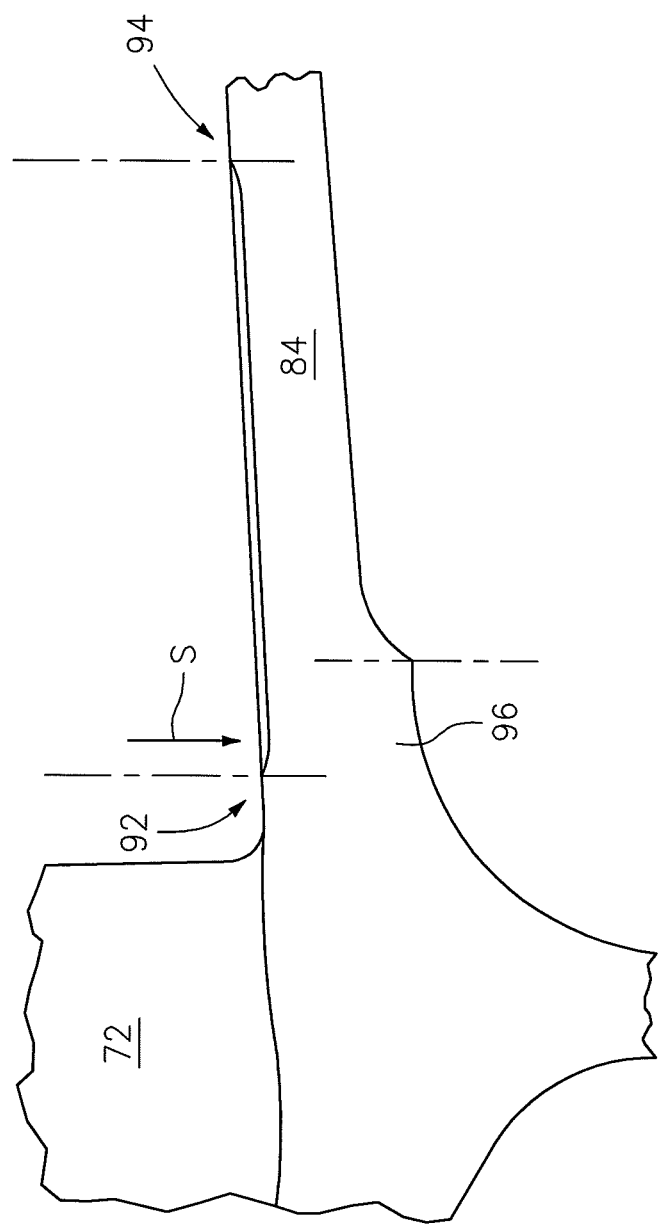
FIG. 5 is an expanded view of the stress relief protrusion of FIG. 4.

With reference to FIG. 4 and continued reference to FIG. 2, the coating pockets 86, 88 are defined by a radially outer surface 90 of the rotor spacer arms 82, 84 and are bounded by respective corner radiuses 92, 94. The coating pockets 86, 88 may result in a relatively high stress concentration factor (Kt; located in the region of arrow S in FIG. 5) which is a multiplying factor for applied stress that allows for the presence of a structural discontinuity such as a notch or hole; Kt equals the ratio of the greatest stress in the region of the discontinuity to the nominal stress for the entire section.

To offset this stress concentration, a stress relief protrusion 96 is provided on a radially inner surface 98 (see FIG. 4) opposite the coating pockets 86, 88 (see FIG. 2) as compared to a non-stress reduction geometry G. The stress relief protrusion 96, in one disclosed non-limiting embodiment, may be formed as a point mismatch 100) on the radially inner surface 98 aft of the web 80.

The point mismatch 100 is generally defined by two concavities 102, 104 with respect to the inner surface 98, and may be generally defined as a cusp or other shape. The point mismatch 100, in the disclosed non-limiting embodiment, is axially located between the respective corner radiuses 92, 94 (also shown in FIG. 5). The stress relief protrusion 96 is thereby primarily located axially below and in-line with the corner radius 92 closest to the web 80. It should be appreciated that various geometries may alternatively or additionally benefit herefrom.

A first radius 106 and a second radius 108 may respectively define the concavities 102, 104, the first radius 106 blended into the web 80. The first radius 106 is at least about twice the radius of the second radius 108. In the disclosed non-limiting embodiment, the first radius 106 is about 450 mils (0.45 inches) and the second radius 108 is about 160 mils (0.16 inches) to provide about 0.11 pounds (50 g) of additional material to reduce stress and thereby facilitate disk life, coating durability, burst resistance, and strength requirements.

Although the different non-limiting embodiments have specific illustrated components, the embodiments of this invention are not limited to those particular combinations. It is possible to use some of the components or features from any of the non-limiting embodiments in combination with features or components from any of the other non-limiting embodiments.

It should be understood that relative positional terms such as "forward," "aft," "upper," "lower," "above," "below," and the like are with reference to the normal operational attitude of the vehicle and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the features within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A rotor for a gas turbine engine, the rotor comprising:
    a rotor hub;
    a web extending from the rotor hub; and
    a rim that extends transverse to the web, the rim having
        a rotor spacer arm which defines a coating pocket and
        a stress relief protrusion opposite the coating pocket, wherein said stress relief protrusion defines a first radius and a second radius, said first radius blended into said web, wherein the first radius is at least about twice the radius of the second radius.

2. A rotor for a gas turbine engine, the rotor comprising:
    a rotor hub;
    a web extending from the rotor hub; and
    a rim that extends transverse to the web, the rim having
        a rotor spacer arm which defines a coating pocket and
        a stress relief protrusion opposite the coating pocket, wherein said stress relief protrusion defines a first radius and a second radius, said first radius blended into said web, wherein the first radius is about 450 mils (0.45 inches) and the second radius is about 160 mils (0.16 inches).

3. A rotor for a gas turbine engine, the rotor comprising:
    a rotor hub;
    a web extending from the rotor hub; and
    a rim that extends transverse to the web, the rim having
        a rotor spacer arm which defines a coating pocket and
        a stress relief protrusion opposite the coating pocket, wherein said stress relief protrusion defines a first radius and a second radius, said first radius blended into said web, wherein the stress relief protrusion is axially between a first corner radius and a second corner radius of the coating pocket.

4. The rotor as recited in claim 3, wherein the stress relief protrusion defines a point mismatch.

5. The rotor as recited in claim 3, wherein the stress relief protrusion is axially aft of the web.

6. A rotor for a gas turbine engine, the rotor comprising:
    a rotor hub;
    a web extending from the rotor hub; and
    a rim that extends transverse to the web, the rim having
        a rotor spacer arm which defines a coating pocket and
        a stress relief protrusion opposite the coating pocket, wherein said stress relief protrusion defines a first radius and a second radius, said first radius blended into said web, wherein the stress relief protrusion is axially aft of a high stress region axially between a first corner radius and a second corner radius of the coating pocket.

7. A rotor for a gas turbine engine, the rotor comprising:
    a rotor hub defined along an axis of rotation;
    a web that radially extends from the rotor hub; and
    a rim that axially extends from the web, the rim defining a first rotor spacer arm and a second rotor spacer arm, and the first and the second rotor spacer arms each including a coating pocket, wherein at least one rotor spacer arm includes a point mismatch on an inner surface opposite the coating pocket, wherein said point mismatch defines a first radius and a second radius, said first radius blended into said web, wherein the first radius is at least about twice the radius as the second radius.

8. A rotor for a gas turbine engine, the rotor comprising:
    a rotor hub defined along an axis of rotation;
    a web that radially extends from the rotor hub; and
    a rim that axially extends from the web, the rim defining a first rotor spacer arm and a second rotor spacer arm, and the first and the second rotor spacer arms each including a coating pocket, wherein at least one rotor spacer arm includes a point mismatch on an inner surface opposite the coating pocket, wherein said point mismatch defines a first radius and a second radius, said first radius blended into said web, wherein the point mismatch is axially between a first corner radius and a second corner radius of the coating pocket.

9. The rotor as recited in claim 8, wherein the point mismatch is axially aft of the web.

10. A rotor for a gas turbine engine, the rotor comprising:
    a rotor hub defined along an axis of rotation;
    a web that radially extends from the rotor hub; and
    a rim that axially extends from the web, the rim defining a first rotor spacer arm and a second rotor spacer arm, and the first and the second rotor spacer arms each including a coating pocket, wherein at least one rotor spacer arm includes a point mismatch on an inner surface opposite the coating pocket, wherein said point mismatch defines a first radius and a second radius, said first radius blended into said web, wherein the point mismatch is axially aft of a high stress region axially between the first corner radius and the second corner radius.

11. A method of stress reduction for a rotor of a gas turbine engine, the method comprising:
    forming a point mismatch to add weight to an inner surface of a rotor spacer arm that extends transverse to a web opposite a coating pocket; and
    forming the point mismatch with a first radius and a second radius, the first radius blended into said web, further comprising forming the point mismatch with two concavities between a first corner radius and a second corner radius of the coating pocket.

12. The method as recited in claim 11, further comprising forming the point mismatch axially aft of the web.

* * * * *